(12) United States Patent
Common (10) Patent No.: US 8,020,330 B2
(45) Date of Patent: Sep. 20, 2011

(54) ACCESSORY FOR A DISPLAY SCREEN

(76) Inventor: David Common, Bossley Park (AU)

( * ) Notice: Subject to any disclaimer, the term of this patent is extended or adjusted under 35 U.S.C. 154(b) by 204 days.

(21) Appl. No.: 12/278,797

(22) PCT Filed: Feb. 2, 2007

(86) PCT No.: PCT/AU2007/000107
§ 371 (c)(1),
(2), (4) Date: Sep. 25, 2008

(87) PCT Pub. No.: WO2007/090226
PCT Pub. Date: Aug. 16, 2007

(65) Prior Publication Data
US 2009/0053685 A1    Feb. 26, 2009

(30) Foreign Application Priority Data

Feb. 8, 2006 (AU) .................. 2006900598
Feb. 17, 2006 (AU) .................. 2006900787
Apr. 4, 2006 (AU) .................. 2006901767
Nov. 20, 2006 (AU) .................. 2006236091

(51) Int. Cl.
G09F 1/12 (2006.01)

(52) U.S. Cl. ............. 40/741; 248/442.2; D14/448

(58) Field of Classification Search ........... 248/442.2; 40/754, 750, 739, 741, 606.13, 610, 606.16, 40/607.04, 606.14
See application file for complete search history.

(56) References Cited

U.S. PATENT DOCUMENTS

| | | | | |
|---|---|---|---|---|
| 1,767,726 A | * | 6/1930 | Woerz ............... | 40/618 |
| 2,006,573 A | * | 7/1935 | Russell ............... | 40/606.13 |
| 2,059,996 A | * | 11/1936 | Goldberg ............ | 40/610 |
| 3,236,481 A | * | 2/1966 | Howard .............. | 248/475.1 |
| 3,451,153 A | * | 6/1969 | Dohanyos ........... | 40/741 |
| 3,935,653 A | * | 2/1976 | Klein ................. | 40/606.13 |
| 4,077,144 A | * | 3/1978 | Smits ................. | 40/590 |
| 4,117,614 A | * | 10/1978 | Bickford ............ | 40/741 |
| 4,869,565 A | * | 9/1989 | Bachman ............ | 312/234 |
| 5,448,841 A | * | 9/1995 | Hampton ............ | 40/730 |
| 5,549,267 A | * | 8/1996 | Armbruster et al. | 248/442.2 |
| 5,988,582 A | | 11/1999 | Olivo | |
| 6,209,246 B1 | | 4/2001 | Schwartz | |
| 6,377,320 B1 | | 4/2002 | Ananian et al. | |
| 6,412,744 B1 | * | 7/2002 | Wollam et al. .... | 248/442.2 |
| 6,564,489 B1 | * | 5/2003 | Bader ............... | 40/610 |
| 2006/0152431 A1 | | 7/2006 | Song | |

FOREIGN PATENT DOCUMENTS

| | | |
|---|---|---|
| AU | 199860657 | 10/1998 |
| CN | 1514444 | 7/2004 |
| CN | 1698024 | 11/2005 |

(Continued)

Primary Examiner — Joanne Silbermann
Assistant Examiner — Shin Kim
(74) Attorney, Agent, or Firm — Davis & Bujold, P.L.L.C.

(57) ABSTRACT

The present invention provides an accessory (10) for a display screen. The accessory (10) includes a first member (12) having a window (18) or a cut out portion, the window or the cut out portion being adapted to provide visual access to at least a portion of the display screen; a second member (14); said first and second members (12, 14) being adapted to be disposed in an overlapping relationship to each other; and attachment means (35) for selectively attaching the first member (12) to the second member (14) whereby a position of the window (18) or the cut out can be adjusted with respect to said display screen.

26 Claims, 5 Drawing Sheets

FOREIGN PATENT DOCUMENTS

| | | |
|---|---|---|
| CN | 201031592 | 4/2007 |
| DE | 196 34 765 | 3/1998 |
| DE | 19634765 | 3/1998 |
| DE | 202007011616 | 8/2007 |
| GB | 2 345 623 | 7/2000 |
| JP | 2001103397 | 4/2001 |
| JP | 2001183631 | 7/2001 |
| JP | 2001218131 | 8/2001 |
| JP | 2002311506 | 10/2002 |
| JP | 2007316671 | 12/2007 |
| JP | 2008009189 | 1/2008 |
| KR | 1020070048150 | 5/2007 |
| WO | 2004077284 | 9/2004 |

* cited by examiner

ACCESSORY FOR A DISPLAY SCREEN

FIELD OF THE INVENTION

This invention relates to an accessory for a display screen, more particularly the invention relates to a frame for a computer monitor or a television device.

BACKGROUND OF THE INVENTION

Add-on accessories for computer monitors are known in the prior art. Such accessories typically include antiglare screens adapted to be mounted onto a computer monitor. It is also known to use adjustable clamps for mounting a document holder upon a computer monitor.

Any reference herein to known prior art does not, unless the contrary indication appears, constitute an admission that such prior art is commonly known by those skilled in the art to which the invention relates, at the priority date of this application.

SUMMARY OF THE INVENTION

The present invention provides an accessory for a display screen, said accessory including: a first member having a window or a cut out portion, said window or said cut out portion being adapted to provide visual access to at least a portion of the display screen; a second member, said first and second members being adapted to be disposed in an overlapping relationship to each other; and attachment means for selectively attaching said first member to said second member whereby a position of said window or said cut out can be adjusted with respect to said display screen.

Preferably said first member includes a peripheral border, said peripheral border being adapted to at least partially surround said display screen.

Said first member can includes at least one aperture adapted to receive a fastener therethrough.

Preferably a position of said first member is adjusted by sliding the first member along said second member.

Preferably said second member includes an U-shaped portion.

The U-shaped portion can include at least one slot, the arrangement being such that the first member can be guided along said slot to adjust a position of said window or said cut-out with respect to said second member.

Said second member can include a window, an opening or a cut out to allow a cable to pass therethrough.

Preferably said accessory further includes support means for supporting said accessory in a free standing position on a substantially horizontal supporting surface.

The support means can include a foldable support member.

Said support means can include a base portion of said second member.

Preferably said second member includes a first section and a second section, said first and second sections being movable relative to each other.

More preferably said first section is adapted to be attached to a middle section of said second member and said second section is foldable relative to said first section.

Preferably said second member includes one or more fold lines along which the second member may fold when it is subjected to an external force or pressure.

Preferably said accessory is adapted to bear one or more of the following: decorative indicia, informative indicia, entertaining indicia, a storage device, a media device, an electronic display.

In a preferred embodiment, the accessory further includes a top member, said top member being movable between a raised position and a lowered position with respect to said window or said cut-out whereby a viewing area of said accessory can be adjusted.

Preferably said top member includes at least one slot, said slot extending in a substantially vertical direction, said slot being adapted to receive a fastener therethrough.

The accessory can further include at least one side member, said side member being movable between a first position and a second position with respect to said window or said cut out.

Preferably said side member includes at least one slot extending in a substantially horizontal direction, said slot being adapted to receive a fastener therethrough.

More preferably said top member and said side member can be arranged such that a fastener can pass through their respective slots.

In another embodiment of the present invention, said first member is slidable along a track disposed on the second member.

Preferably said first member includes one or more of the following: an access opening adapted to provide access to an operating control of the display screen, an opening adapted to allow a cable to pass therethrough; a portion adapted to provide remote access to said display screen.

Said first member can include a portion made of transparent, semi-transparent or translucent material.

BRIEF DESCRIPTION OF THE DRAWINGS

An embodiment or embodiments of the present invention will now be described, by way of example only, with reference to the accompanying drawings, in which like reference numerals refer to like parts, and in which.

DETAILED DESCRIPTION OF THE EMBODIMENT OR EMBODIMENTS

Illustrated in FIGS. 1 to 10 is a frame according to the present invention. The frame 10 includes a front panel 12 and a rear panel 14.

Figure 1:
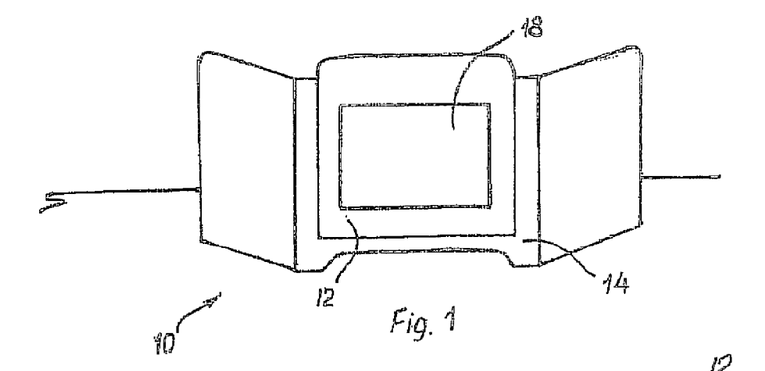
FIG. 1 is a front perspective view of a frame according to a preferred embodiment of the present invention.
Figure 2:
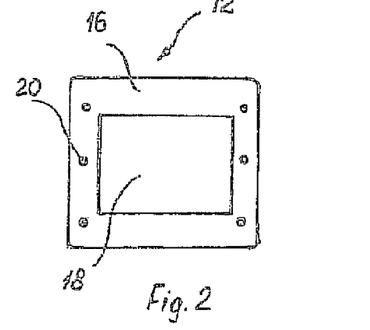
FIG. 2 is a front elevation view of a front panel of the frame of FIG. 1.

The front panel 12 is substantially rectangular and includes a peripheral border 16 and window 18 through which a viewer can view at least a portion of a display screen (not shown) of a television device or a computer monitor or a laptop. In a preferred embodiment of the present invention, the window 18 is sized and shaped to correspond to the entire display screen with which the frame 10 is to be used.

In use, the front panel 12 and the display screen are disposed in a generally parallel relationship so that the position of the window 18 substantially conforms to the contours of the display screen.

In an alternative embodiment of the present invention (not shown), the front panel 12 includes a portion made of transparent, semi-transparent or translucent material. The portion can be in the form of a window defined by a peripheral border. The window can perform the function of an antiglare screen for a computer monitor.

As best shown in FIG. 2, the front panel 12 includes a plurality of apertures 20 adapted to receive a fastener therethrough.

Figure 3:
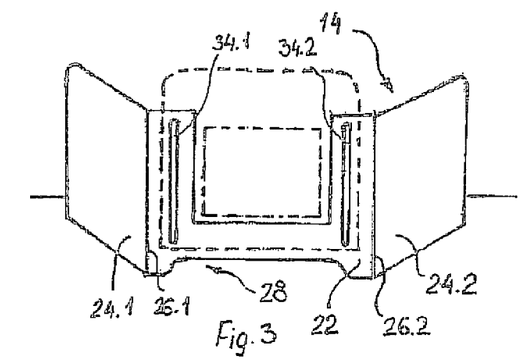
FIG. 3 is a front perspective view of a rear panel of the frame FIG. 1 showing the rear panel in a folded configuration.

The rear panel 14 includes a generally U-shaped middle section 22 and two side sections 24.1 and 24.2 extending outwardly therefrom. In a preferred embodiment of the invention, the side sections 24.1 and 24.2 are movably connected to the middle section 22 to allow the angle of the side sections 24.1, 24.2 relative to the middle section 22 to be adjusted.

To this end, the middle section 22 of the rear panel 14 is separated from the side sections 24.1, 24.2 by fold lines 26.1 and 26.2 respectively, the arrangement being such that in use, each side section 24.1, 24.2 can be folded to extend rearwardly from the middle section 22, at an angle, as is illustrated in FIG. 1. The frame 10 thus serve to block out background objects located in the vicinity of the display screen thereby providing a user of the display screen with an enhanced viewing experience.

In an alternative embodiment of the present invention (not shown), the side sections 24.1, 24.2 are folded to extend forwardly from the middle section 22 to restrict the display screen from view thereby providing privacy for the user of the screen display.

More preferably, the side sections 24.1 and 24.2 are foldable towards the middle section 22 so that the rear panel 14 may be easily collapsed, or folded, for storage and transportation.

It will be appreciated by those skilled in the art that the side sections 24.1 and 24.2 can be hingedly mounted to opposing sides of the middle section 22. To this end, any suitable hinge means known in the art can be used.

It will be further appreciated by those skilled in the art, that the frame 10 can further include locking means (not shown) for locking the side sections 24.1, 24.2 in a desired configuration.

Alternatively, the frame 10 can be made in a desired configuration during a manufacturing process.

As shown in FIG. 3, the bottom portion of middle section 22 is provided with a cut out 28 to allow a keyboard cable and or a mouse cable to pass therethrough.

Figure 6:
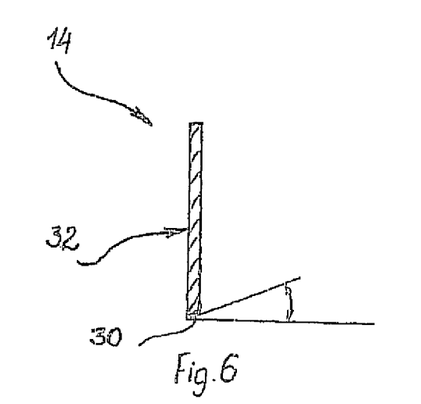
FIG. 6 is a cross-sectional view of a middle section of the rear panel of the frame of FIG. 1 taken along line A-A of FIG. 4.

As illustrated in FIG. 6, a base surface 30 of the middle section 22 is angled at a ratio 1:50 with respect to the front surface 32. It will be appreciated by those skilled in the art that any suitable ratio can be used in the present invention.

In an alternative embodiment of the present invention (not shown), the base surface 30 is substantially perpendicular to the front surface 32.

It will be further appreciated by those skilled in the art that the rear panel 14 can be provided with one or more support members (eg, a foldable leg, not shown) extending therefrom to support the rear panel in a free-standing position on a substantially horizontal surface.

As best illustrated in FIG. 3, the middle section 22 is provided with two generally parallel slots 34.1, 34.2 to allow height adjustment of the front panel 12 relative to the rear panel 14. The slots 34.1, 34.2 are formed in opposing sides of the middle section 22.

The slots 34.1 and 34.2 are sized and shaped to allow a fastener 35 to pass therethrough so that the front panel 12 can be removably attached to the rear panel 14. It will be appreciated by those skilled in the art, that any suitable fastener means can be used in the present invention (a nut and a bolt, a Velcro closure, a clamp, a clip, etc).

Figure 5:
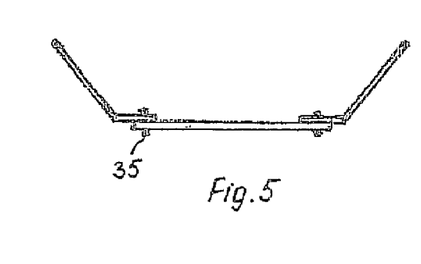
FIG. 5 is a top view of the frame of FIG. 1 showing the frame in a folded configuration.

To achieve this, the front panel 12 and the rear panel 14 are positioned in a generally parallel overlapping relationship to allow substantial alignment of the apertures 20 and the respective slots 34.1, 34.2 so that the fastener 35 can extend through the aperture 20 into the slot 34 as shown in FIG. 5. The fastener 35 is confined horizontally in the slot 34 but is movable vertically therealong. The opposite ends of the slot 34, however, limit the range of motion for the fastener 35.

The height adjustment of the front panel 12 with respect to a display screen is achieved by guiding the fastener(s) along the respective slot 34 so that the window 18 and the display screen are substantially aligned in a vertical direction, the arrangement being such the peripheral border 16 of the front panel 12 substantially surrounds both sides, the top and the bottom of the display screen.

Figure 4:
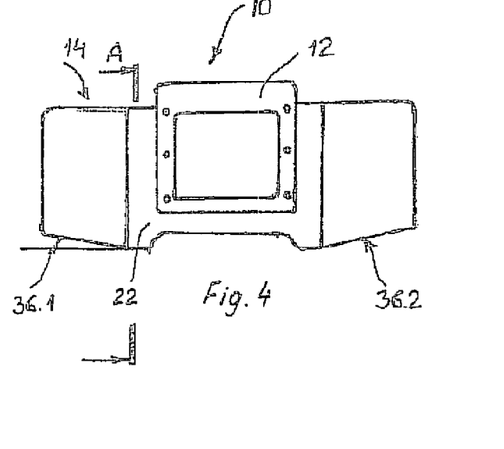
FIG. 4 is a front view of the frame of FIG. 1 showing the frame in an unfolded configuration.

As best illustrated in FIG. 4, base surfaces 36.1, 36.2 of the side sections 24.1, 24.2 can be angled at a suitable angle (eg, 10 mm/150 mm) with respect to a lengthwise direction of the middle section 22 of the rear panel 14 to support the frame 10 in a free standing position on a substantially horizontal surface.

Figure 7:
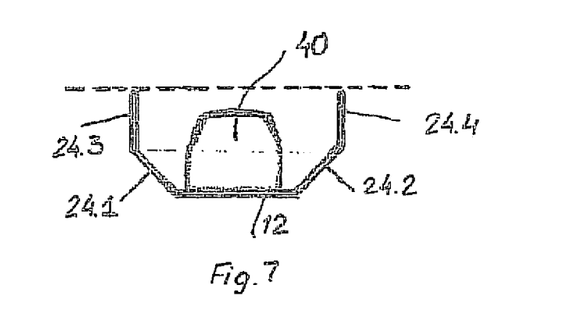
FIG. 7 is a schematic top view of another embodiment of the present invention showing the frame in a first configuration.
Figure 8:
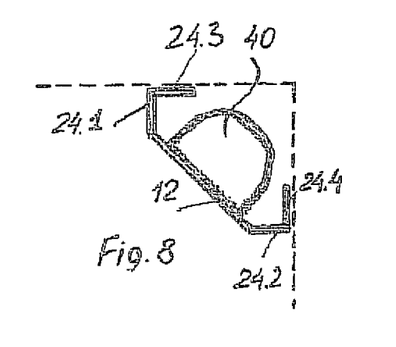
FIG. 8 is a schematic top view of the frame of FIG. 7 showing the frame in a second configuration.
Figure 9:
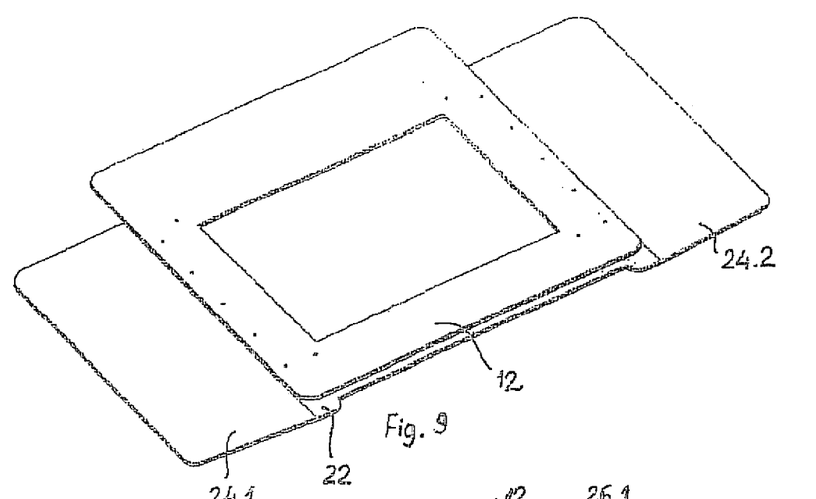
FIG. 9 is a front perspective view of the frame of FIG. 1 showing the frame in an unfolded configuration.
Figure 10:
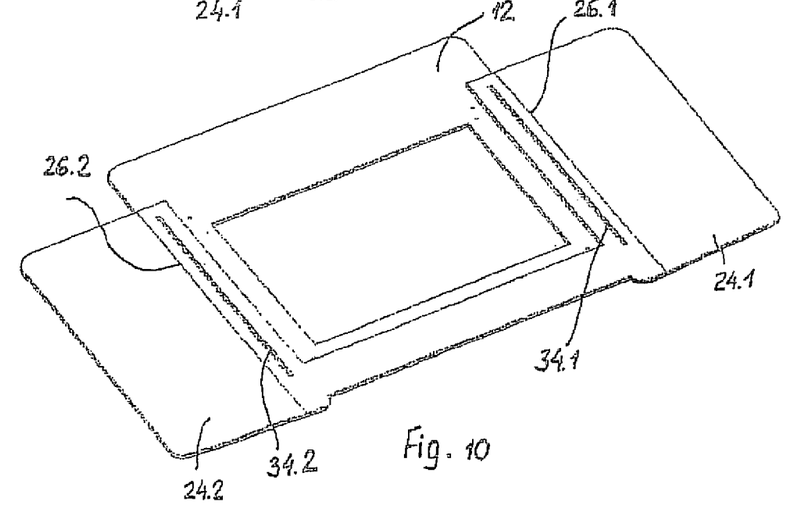
FIG. 10 is rear perspective view of the frame of FIG. 1 showing the frame in an unfolded configuration.

As shown in FIGS. 7 and 8, the rear panel 14 can include four or more side portions 24.1, 24.2, 24.3, 24.4 to partially or completely encircle a display screen of a device 40. The frame 10 can be in the form of a sleeve (not shown) surrounding a display screen. It will be further appreciated by those skilled in the art that the frame 10 can be adapted to fold out in any desired configuration.

The frame 10 can be made of any suitable material (eg, metal, cardboard, plastics etc). It will be appreciated by those skilled in the art that any combination of suitable materials can be used in the present invention. The window portion of the material can be used for a mouse pad.

The surfaces of the frame 10 can be flat. In other embodiments of the present invention, the frame 10 can include recesses, embossments, operating controls (including false operating controls in the form of a button, dummy switches), etc.

In a preferred embodiment of the present invention, the frame 10 bears one or more of the following: decorative indicia (eg, artwork, 3D graphics, postcards, photos), informative indicia (eg, instructions, safety information), entertaining indicia (eg, electronic games, game controls, puzzles), storage devices (eg, CD-holders, trays, pockets, document holders) and other devices (eg, speakers, cameras, mobile phone holders, calculators, electronic displays, lighting devices, etc).

The frame 10 can includes surfaces adapted to fiction as a white board or a black board. The frame 10 can also include a magnetic surface, etc.

The frame 10 can be provided with fabric or plastic sleeves or covers which are adapted to fit over the parts of the frame. Such sleeves or cover can bear printed graphics, etc.

In other embodiments of the present invention, the frame 10 is used to create advertising space surrounding a display screen.

The frame 10 is assembled as follows. The front panel 12 and the rear panel 14 are positioned in an overlapping relationship so that the aperture 20 is aligned with the slot 34. As shown in FIG. 5, the fastener 35 extends through the aperture 20 into the slot 34. The fastener 35 can be guided along the respective slot 34. The height adjustment of the front panel 12 with respect to a display screen is achieved by sliding the panel 12 up and down the front surface 32 of the rear panel 14. The fastener 35 is then tightened to secure the front panel 12 to the rear panel 14. The longitudinal position of the frame 10 with respect to the display screen is adjusted by moving the frame 10 in a generally horizontal direction.

Illustrated in FIGS. 11 to 14 is a frame 100 according to another embodiment of the present invention. Similarly to the frame 10, the frame 100 includes: a front panel 120 having a window 180 and a plurality of apertures 200; and a rear panel 140 including a middle section 220 provided with slots 340.1, 340.2 and side sections 240.1, 240.2.

Figure 11:
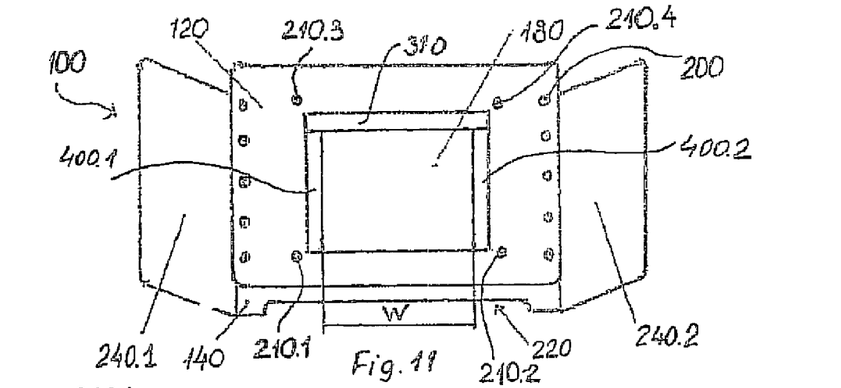
FIG. 11 is a front perspective view of a frame according to another embodiment of the present invention.
Figure 12:
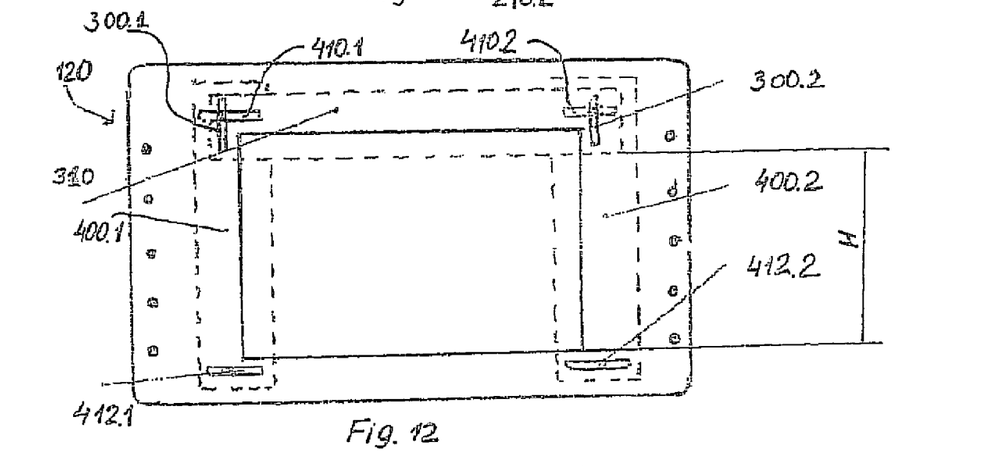
FIG. 12 is a front elevation view of a front panel of the frame of FIG. 11.
Figures 13, 14:
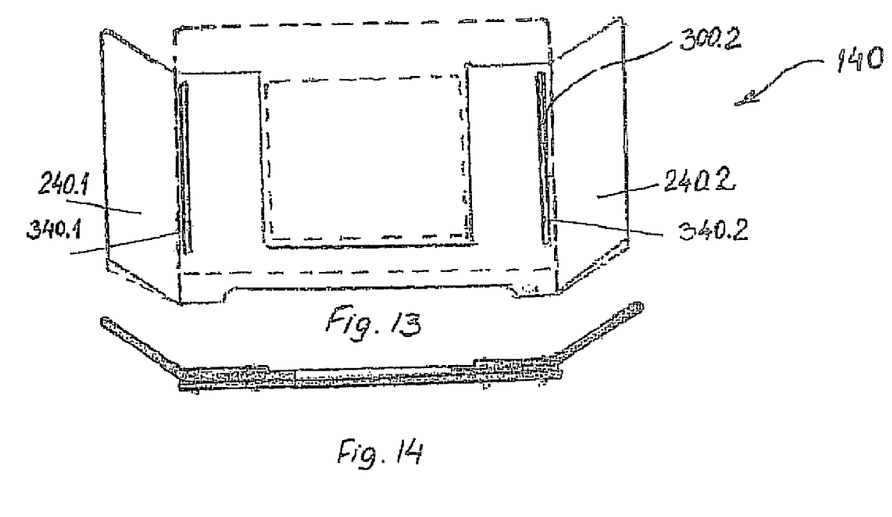
FIG. 13 is a front perspective view of a rear panel of the frame FIG. 11 showing the rear panel in a folded configuration.
FIG. 14 is a top view of the frame of FIG. 11 showing the frame in a folded configuration.

As best shown in FIGS. 11 and 12, the front panel 120 is provided with a second plurality of apertures 210.1, 210.2, 210.3, 210.4 adapted to receive a fastener therethrough. This second plurality of apertures is arranged in two substantially horizontal rows along the opposing portions of the front panel 120.

The frame 100 further includes a top planar member 310 of rectangular shape. The top member 310 is provided with two slots 300.1 and 300.2 formed in the opposite end portions of the top member 310. The slots 300.1 and 300.2 are sized and shaped to allow a fastener to pass therethrough.

The position of the top member 310 with respect to the window 180 can be adjusted by sliding the top member 310 up and down the rear surface of the front panel 120. When the required position of the top member 310 is achieved, the fastener can be tightened to secure the top member 310 in place. As a result, the height H of the viewing area of the frame 100 can be adjusted.

As best illustrated in FIG. 11, the frame 100 further includes two side members 400.1, 400.2. Each side member 400.1, 400.2 is provided with a pair of slots (410.1, 412.1), (410.2, 412.2) respectively. The slots 410.1, 410.2 are sized to receive fasteners of the same diameter as the slots 300.1, 300.2, the arrangement being such that in use slots 300 and 410 are substantially perpendicular to each other.

The position of the side members 400.1, 400.2 with respect to the window 180 is adjusted in a manner similar to those described above, namely by sliding the side members 400.1, 400.2 in a generally horizontal direction. When the desired position of the side member 400.1, 400.2 is achieved, the fastener is tightened to secure the side member 400.1, 400.2 in place. As a result, the width W of the viewing area of the frame 100 can be adjusted.

As a result of the foregoing, the accessory 100 can be adjusted to suit various sizes of computer monitor screens or television set screens.

Figure 15:
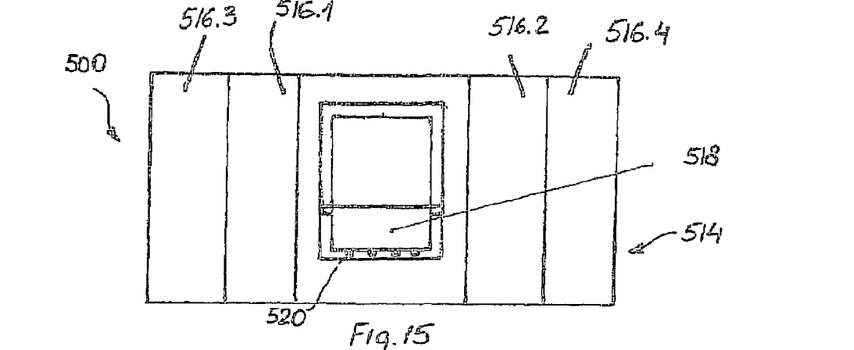
FIG. 15 is a schematic front elevation view of a frame according to another embodiment of the present invention.
Figure 16:
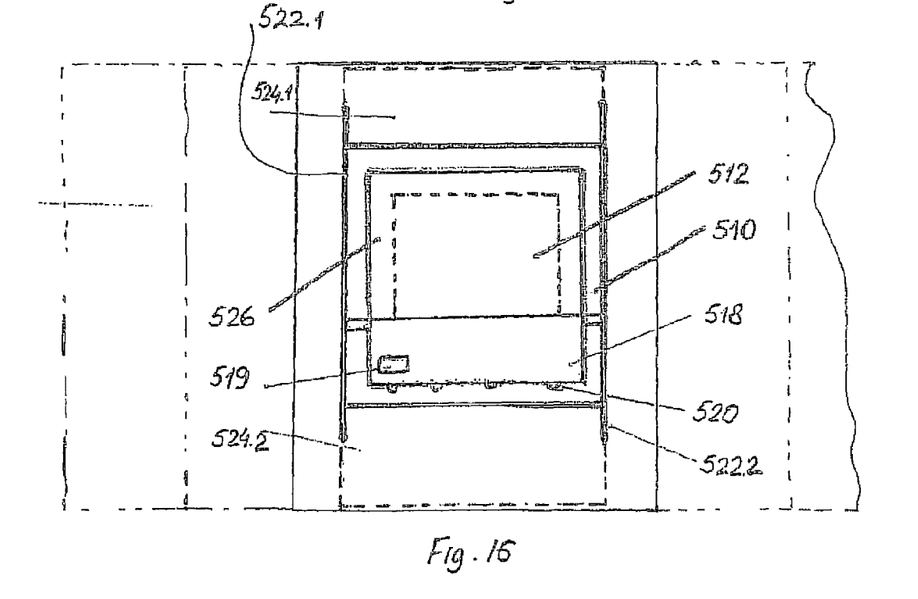
FIG. 16 is a front elevation view of the frame of FIG. 15.

Illustrated in FIGS. 15 and 16 is a frame 500 according to another embodiment of the present invention. Similarly to the frames 10 and 100, the flame 500 includes a front member 510 having a window 512, and a rear member 514 including a plurality of foldable side sections 516.1, 516.2, 516.3, 516.4.

Located below the window 512 is an access door 518 adapted to provide access to the operating controls of a television set or a computer monitor. As best shown in FIG. 15, the access door is provided with an opening 519 to allow remote control device to communicate with their respective hosts. The front member 510 is also provided with a plurality of openings 520 to allow a cable to pass therethrough.

The vertical position of the front member 510 is adjusted by sliding the front member 510 along two tracks 522.1, 522.2 positioned on the opposing sides of the window 512.

The frame 500 further includes infills 524.1, 524.2 sized and shaped to fill in voids or openings in the front member 510, as is illustrated in FIG. 16.

Similarly to the frame 100, the frame 500 can further includes secondary panels 526 for adjusting the size of the viewing area of the frame 500.

Where ever it is used, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

It will be understood that the invention disclosed and defined herein extends to all alternative combinations of two or more of the individual features mentioned or evident from the text. All of these different combinations constitute various alternative aspects of the invention.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, and all modifications which would be obvious to those skilled in the art are therefore intended to be embraced therein.

The invention claimed is:

1. An accessory for an electronic display screen comprising:
    a first member having an adjustable screen aperture arranged to, in use, substantially align the aperture with one or more edges of the electronic display screen to define a viewing area;
    a second member arranged to support the first member, the first and second members being adjustable to adjust the height of the aperture relative to the base of the second member; and
    an aperture adjustment arrangement associated with the first member to adjust the size of the viewing area defined by the aperture the adjustment arrangement including:
        a top member being engaged with the first member to move in a generally vertical direction between a raised position and a lowered position with respect to said aperture to adjust the size of the viewing area; and
        at least one side member engaged with the first member to move in a generally horizontal direction between a first and second position with respect to said aperture to adjust the size of the viewing area.

2. The accessory in accordance with claim 1, wherein the top member is slidably engaged to the first member.

3. The accessory in accordance with claim 1, wherein the at least one side member is slidably engaged to the first member.

4. The accessory as claimed in claim 1, wherein the aperture adjustment comprises at least one planar member arranged to removably engage the first member to adjust the size of the aperture.

5. The accessory as claimed in claim 1, wherein said first member includes a rear surface, at least a portion of said rear surface being arranged to abut at least a portion of said second member.

6. The accessory as claimed in claim 1, wherein said the first member has a peripheral border, the peripheral border substantially surrounds said display screen.

7. The accessory as claimed in claim 1, wherein a position of said first member is adjusted by sliding the first member along a portion of the second member.

8. The accessory as claimed in claim 1, wherein said second member includes an U-shaped portion.

9. The accessory as claimed in claim 8, wherein said U-shaped portion includes at least one slot, the arrangement being such that the first member can be guided along said slot to adjust a position of said aperture with respect to said second member.

10. The accessory as claimed in claim 9, wherein, in use, said slot extends in a substantially vertical direction.

11. The accessory as claimed in claim 1, wherein said second member includes at least one of a window, an opening and a cut out to allow a cable to pass therethrough.

12. The accessory as claimed in claim 1, wherein said attachment means includes a bolt and a nut, said bolt being located and moveable in a slot formed in said second member, whereby a position of said aperture can be adjusted with respect to said second member.

13. The accessory as claimed in claim 1, said accessory further including support means for supporting said accessory in a free standing position on a substantially horizontal supporting surface.

14. The accessory as claimed in claim 13, wherein said support means includes a foldable support member or a base portion of said second member.

15. The accessory as claimed in claim 1, wherein said second member includes a first section and a second section, said first and second sections being movable relative to each other.

16. The accessory as claimed in claim 15, wherein said first section is arranged to be attached to a middle section of said second member and wherein said second section is foldable relative to said first section.

17. The accessory as claimed in claim 1, wherein said second member includes a middle section and at least two side sections, said side sections being arranged to be disposed at an angle with respect to the middle section.

18. The accessory as claimed in claim 1, wherein said accessory is adapted to bear at least one of the following: decorative indicia, informative indicia, entertaining indicia, a storage device, a media device, an electronic display.

19. The accessory as claimed in claim 1, wherein said accessory includes a surface arranged to function as a white board or a black board.

20. The accessory as claimed in claim 1, wherein said accessory includes at least one of a magnetic surface and a portion made of transparent, semi-transparent or translucent material.

21. The accessory as claimed in claim 2, wherein said top member includes at least one slot, said slot extending in a substantially vertical direction, said slot being arranged to receive a fastener therethrough.

22. The accessory as claimed in claim 3, wherein said side member includes at least one slot extending in a substantially horizontal direction, said slot being arranged to receive a fastener therethrough.

23. The accessory as claimed in claim 22, wherein in use said top member and said side member are arranged such that a fastener can pass through their respective slots.

24. The accessory as claimed in claim 1, wherein said first member is slidable along a track disposed on the second member.

25. The accessory as claimed in claim 1, wherein said first member includes at least one of: an access opening arranged to provide access to an operating control of the display screen, an opening arranged to allow a cable to pass therethrough and; a portion arranged to provide remote access to said display screen.

26. The accessory as claimed in claim 6, wherein the first member is arranged to be adjusted relative to the base of the second member such that the peripheral border is in alignment with the display screen.

* * * * *